United States Patent
Yoon et al.

(10) Patent No.: US 10,102,790 B2
(45) Date of Patent: Oct. 16, 2018

(54) DISPLAY DEVICE

(71) Applicant: Samsung Display Co., Ltd., Yongin-si (KR)

(72) Inventors: Ki Tae Yoon, Seoul (KR); Jae Hyoung Park, Suwon-si (KR); Young Soo Sohn, Guri-si (KR); Soon Gyu Lee, Daegu (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/454,145

(22) Filed: Mar. 9, 2017

(65) Prior Publication Data

US 2017/0330500 A1 Nov. 16, 2017

(30) Foreign Application Priority Data

May 16, 2016 (KR) .................. 10-2016-0059434

(51) Int. Cl.
*G09G 3/20* (2006.01)
*G02F 1/1335* (2006.01)
*G02F 1/1333* (2006.01)

(52) U.S. Cl.
CPC ..... *G09G 3/2007* (2013.01); *G02F 1/133512* (2013.01); *G09G 3/20* (2013.01); *G09G 3/2003* (2013.01); *G02F 2001/133388* (2013.01); *G02F 2201/56* (2013.01); *G09G 2300/0452* (2013.01); *G09G 2310/0232* (2013.01); *G09G 2320/0233* (2013.01); *G09G 2320/0242* (2013.01)

(58) Field of Classification Search
CPC ............... G09G 3/2007; G09G 3/2003; G09G 2320/0242; G09G 2320/0233; G09G 2310/0232; G09G 2300/0452; G02F 2001/133388
See application file for complete search history.

(56) References Cited

U.S. PATENT DOCUMENTS

| | | | |
|---|---|---|---|
| 2009/0195481 A1* | 8/2009 | Taguchi | G02B 5/201 345/55 |
| 2009/0309813 A1 | 12/2009 | Fujita | |
| 2010/0020277 A1 | 1/2010 | Morita | |
| 2015/0035867 A1 | 2/2015 | Yeo et al. | |
| 2016/0178940 A1 | 6/2016 | Yuan et al. | |

FOREIGN PATENT DOCUMENTS

| | | |
|---|---|---|
| CN | 104570457 | 4/2015 |
| KR | 10-0852414 | 8/2008 |
| KR | 10-2011-0130177 | 12/2011 |
| KR | 10-2012-0004119 | 1/2012 |
| KR | 10-2015-0014710 | 2/2015 |

OTHER PUBLICATIONS

Extended European Search Report dated Aug. 1, 2017, in European Patent Application No. 17171220.1.

* cited by examiner

Primary Examiner — Liliana Cerullo

(74) Attorney, Agent, or Firm — H.C. Park & Associates, PLC

(57) ABSTRACT

The present disclosure relates to a display device including: a substrate having a rounded corner; a plurality of pixels disposed on the substrate; and a light blocking member disposed on a corner of the substrate and overlapping at least part of a first pixel of the plurality of pixels, the first pixel disposed at the rounded corner, wherein the first pixel is configured to generate a lower luminance, the lower luminance referring to a luminance lower than a normal luminance.

20 Claims, 14 Drawing Sheets

DISPLAY DEVICE

CROSS-REFERENCE TO RELATED APPLICATION

This application claims priority from and the benefit of Korean Patent Application No. 10-2016-0059434, filed on May 16, 2016, which is hereby incorporated by reference for all purposes as if fully set forth herein.

BACKGROUND

Field

Exemplary embodiments relate to a display device. More particularly, exemplary embodiments relate to a display device having a rounded corner.

Discussion of the Background

A display device refers to a device for displaying an image, and includes a liquid crystal display, an organic light emitting diode display, and the like. The display device is generally formed as an approximate quadrangle shape. Recently, the display device has been used in various applications, and a display device having a rounded corner has been developed.

The display device includes a plurality of pixels, and the plurality of pixels is disposed in a matrix shape. In the display device having the rounded corner, when a pixel overlapping a light blocking member disposed in the rounded corner are turned off, the corner of the screen appears to have a stepped shape. In the display device having the rounded corner, when the pixel overlapping the light blocking member disposed in the rounded corner are turned on, some subpixels included in one pixel are covered by the light blocking member and therefore, the overlapping pixel may not display a correct gray scale value for the color white. For example, when an area of the blue subpixel overlapping with the light blocking member is relatively smaller than those of other subpixels, the overlapping pixel may be recognized as a blue band.

Each of the plurality of pixels respectively may include; a first subpixel configured to generate a first color, a second subpixel configured to generate a second color, and a third subpixel configured to generate a third color, a sum of the first color, the second color, and the third color may generate a white color, and the first subpixel, the second subpixel, and the third subpixel may be arranged along a first direction.

The display device may further include a second pixel of the plurality of pixels disposed adjacent to the first pixel in the first direction, farther from the rounded corner of the substrate than the first pixel, wherein at least one of the first subpixel, the second subpixel, and the third subpixel of the first pixel may completely overlap the light blocking member, and wherein the second pixel may be configured to generate the lower luminance.

The first subpixel of the first pixel may completely overlap the light blocking member, and a sum of a gray value generated by the second subpixel of the first pixel and a gray value generated by the second subpixel of the second pixel is the same as a gray value of the normal luminance generated the second subpixel of the second pixel.

The gray value generated by the second subpixel of the first pixel may be equal to or smaller than the gray value generated by the second subpixel of the second pixel.

A sum of a gray value generated by a third subpixel of the first pixel and a gray value generated by a third subpixel of the second pixel is the same as the gray value of the normal luminance generated by the second pixel.

The gray value generated by the third subpixel of the first pixel may be equal to or smaller than the gray value generated by the third subpixel of the second pixel.

The display device may further include a second pixel of the plurality of pixels disposed adjacent to the first pixel in the first direction, farther from the rounded corner of the substrate than the first pixel, wherein each of the first subpixel, the second subpixel, and the third subpixel of the first pixel may not completely overlap the light blocking member, and wherein the second pixel may be configured to generate the normal luminance.

An area that the first subpixel of the first pixel overlapping the light blocking member may be larger than an area that the second subpixel of the first pixel overlapping the light blocking member, an area that the first subpixel of the first pixel overlapping the light blocking member may be larger than an area that the third subpixel of the first pixel overlapping the light blocking member, and the first subpixel of the first pixel may be configured to generate the normal luminance, and the second subpixel of the first pixel and the third subpixel of the first pixel are configured to generate the lower luminance.

The display device may further include a second pixel of the plurality of pixels disposed adjacent to the first pixel in the first direction, farther from the rounded corner of the substrate than the first pixel, wherein an area of at least one of the first subpixel, the second subpixel, and the third subpixel of the first pixel overlapping the light blocking member may be 50% or more of a total area of the at least one of the first subpixel, the second subpixel, and the third subpixel of the first pixel, and wherein the second pixel may be configured to generate the lower luminance.

The area of the first subpixel of the first pixel overlapping the light blocking member may be 50% or more of the total area of the first subpixel of the first pixel, a sum of a gray value generated by the second subpixel of the first pixel and a gray value generated by the second subpixel of the second pixel is the same as a gray value of the normal luminance generated by the second subpixel of the second pixel.

The gray value generated by the second subpixel of the first pixel may be equal to or smaller than the gray value generated by the second subpixel of the second pixel.

A sum of a gray value generated by the third subpixel of the first pixel and a gray value generated by the third subpixel of the second pixel may be the same as a gray value of the normal luminance generated by the second pixel.

The gray value generated by the third subpixel of the first pixel may be equal to or smaller than the gray value generated by the third subpixel of the second pixel.

The display device may further include a second pixel of the plurality of pixels disposed adjacent to the first pixel in the first direction, farther from the rounded corner of the substrate than the first pixel, wherein areas of each of the first subpixel, the second subpixel, and the third subpixel of the first pixel overlapping the light blocking member may be less than 50% of a total area of the each of the first subpixel, the second subpixel, and the third subpixel of the first pixel, and wherein the second pixel may be configured to generate the normal luminance.

The area that the first subpixel of the first pixel overlapping the light blocking member may be larger than the area that the second subpixel of the first pixel overlapping the light blocking member, the area that the first subpixel of the first pixel overlapping the light blocking member may be larger than the area that the third subpixel of the first pixel overlapping the light blocking member, and the first subpixel of the first pixel is configured to generate the normal luminance, and the second subpixel of the first pixel and the third subpixel of the first pixel are configured to generate the lower luminance.

The display device may further include a second pixel of the plurality of pixels disposed adjacent to the first pixel in the first direction, farther from the rounded corner of the substrate than the first pixel, wherein the second pixel may be configured to generate a luminance higher than the first pixel.

The display device may further include a third pixel to an n-th pixel of the plurality of pixels sequentially disposed in the first direction adjacent from the first pixel away from the rounded corner, wherein the first pixel to the n-th pixel may be configured to generate luminance gradually increasing in the first direction, and wherein n may be a natural number equal to or greater than 3.

The first pixel may be configured to generate a black gray value.

The display device may further include a second pixel to an n-th pixel of the plurality of pixels sequentially disposed in the first direction adjacent from the first pixel away from the rounded corner, wherein the first pixel to the n-th pixel may be configured to generate luminance gradually increasing in the first direction, and wherein n may be a natural number equal to or greater than 2.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device in which a rounded corner does not appear as a step shape. Also, a display device in which a pixel disposed at the rounded corner may display a proper gray value when displaying white is provided.

Additional aspects will be set forth in the detailed description which follows, and, in part, will be apparent from the disclosure, or may be learned by practice of the inventive concept.

An exemplary embodiment discloses a display device including: a substrate having a rounded corner; a plurality of pixels disposed on the substrate; and a light blocking member disposed on a corner of the substrate and overlapping at least part of a first pixel of the plurality of pixels, the first pixel disposed at the rounded corner, wherein the first pixel is configured to generate a lower luminance, the lower luminance referring to a luminance lower than a normal luminance.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
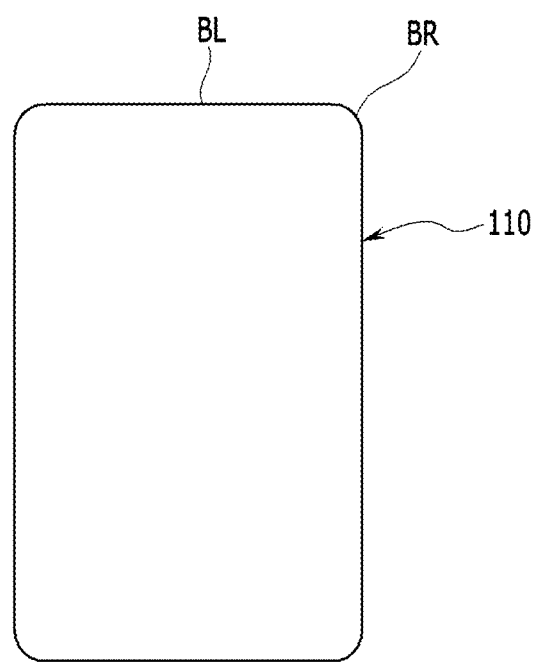
FIG. 1 is a top plan view showing a display device according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a top plan view showing a display device according to an exemplary embodiment.

A display device according to an exemplary embodiment includes a substrate 110, and a plurality of pixels is disposed on the substrate 110. Each pixel includes a thin film transistor and a pixel electrode connected to the thin film transistor. By controlling a data voltage applied to the pixel electrode of each pixel, luminance of each pixel may be controlled, thereby displaying the screen. The display device according to the present exemplary embodiment may be a liquid crystal display, an organic light emitting diode display, etc.

The substrate 110 is entirely formed as a quadrangle, and each corner has a rounded shape. That is, the substrate 110 includes a straight edge (BL) and a rounded corner (BR). The substrate 110 includes four straight edges BL, and four rounded corners BR are respectively disposed between two neighboring straight edges BL. The shape of the display device is determined depending on the shape of the substrate 110. That is, the display device according to the present exemplary embodiment has the quadrangle shape like the shape of the substrate 110, and each corner has the rounded shape.

However, the exemplary embodiment is not limited thereto, and the substrate 110 may be formed of various shapes which include rounded corners. Also, the substrate 110 may be made to be circular or oval.

Next, the pixels disposed at the rounded corner of the display device and the pixels adjacent thereto according to an exemplary embodiment will be described with reference to FIG. 2.

Figure 2:
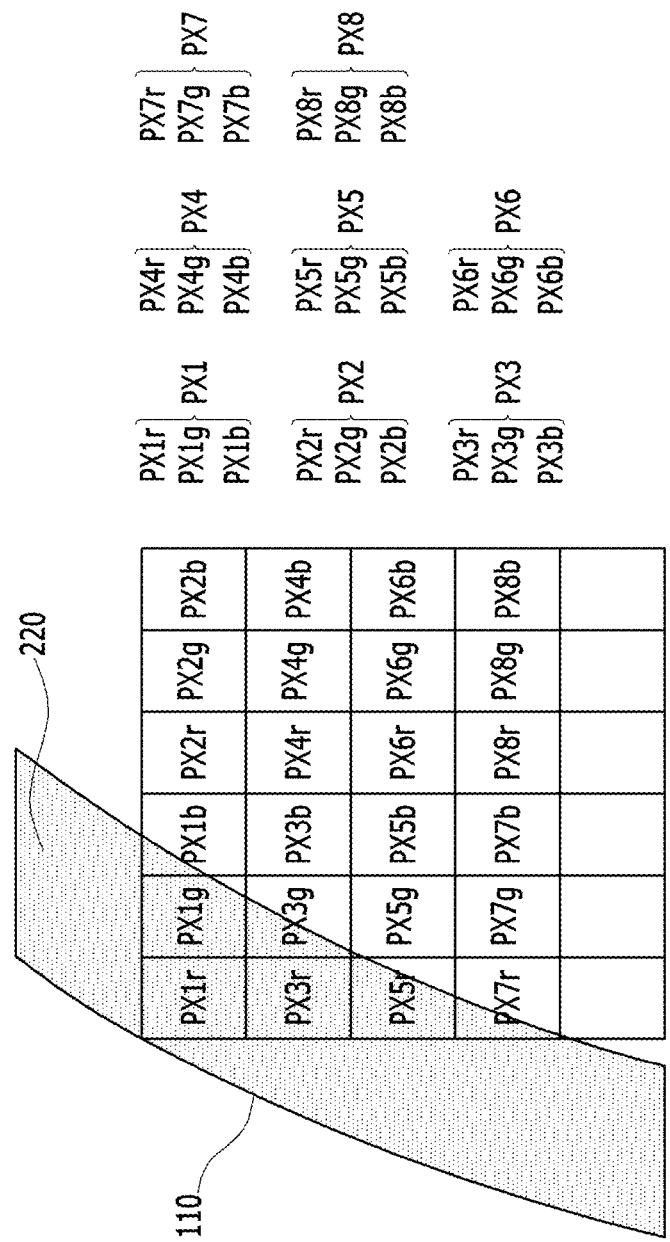
FIG. 2 is a top plan view showing pixels of a portion of a display device according to an exemplary embodiment.

FIG. 2 is a top plan view showing pixels of a portion of a display device according to an exemplary embodiment. FIG. 2 shows the pixels disposed at the rounded corner and the pixels adjacent thereto.

A first pixel PX1, a second pixel PX2, a third pixel PX3, a fourth pixel PX4, a fifth pixel PX5, a sixth pixel PX6, a seventh pixel PX7, and an eighth pixel PX8 are disposed on the substrate 110 of the display device according to an exemplary embodiment.

Each of the pixels PX1, PX2, PX3, PX4, PX5, PX6, PX7, and PX8 includes a first subpixel PX1r, PX2r, PX3r, PX4r, PX5r, PX6r, PX7r, and PX8r, a second subpixel PX1g, PX2g, PX3g, PX4g, PX5g, PX6g, PX7g, and PX8g, and a third subpixel PX1b, PX2b, PX3b, PX4b, PX5b, PX6b, PX7b, and PX8b. That is, the first pixel PX1 includes the first subpixel PX1r, the second subpixel PX1g, and the third subpixel PX1b, the second pixel PX2 includes the first subpixel PX2r, the second subpixel PX2g, and the third subpixel PX2b, the third pixel PX3 includes the first subpixel PX3r, the second subpixel PX3g, and the third subpixel PX3b, and the fourth pixel PX4 includes the first subpixel PX4r, the second subpixel PX4g, and the third subpixel PX4b. The fifth pixel PX5 includes the first subpixel PX5r, the second subpixel PX5g, and the third subpixel PX5b, the sixth pixel PX6 includes the first subpixel PX6r, the second subpixel PX6g, and the third subpixel PX6b, the seventh pixel PX7 includes the first subpixel PX7r, the second subpixel PX7g, and the third subpixel PX7b, and the eighth pixel PX8 includes the first subpixel PX8r, the second subpixel PX8g, and the third subpixel PX8b.

Each of the first subpixels PX1r, PX2r, PX3r, PX4r, PX5r, PX6r, PX7r, and PX8r may be a subpixel displaying a red color, each of the second subpixels PX1g, PX2g, PX3g, PX4g, PX5g, PX6g, PX7g, and PX8g may be a subpixel displaying a green color, and each of the third subpixels PX1b, PX2b, PX3b, PX4b, PX5b, PX6b, PX7b, and PX8b may be a subpixel displaying a blue color. The subpixels displaying the same color may be disposed in the same column. However, the arrangement shape of the subpixels is not limited thereto and may be variously changed. Also, while each pixel includes the red subpixel, the green subpixel, and the blue subpixel, the present invention is not limited thereto. A first color displayed by the first subpixels PX1r, PX2r, PX3r, PX4r, PX5r, PX6r, PX7r, and PX8r, a second color displayed by the second subpixels PX1g, PX2g, PX3g, PX4g, PX5g, PX6g, PX7g, and PX8g, and a third color displayed by the third subpixels PX1b, PX2b, PX3b, PX4b, PX5b, PX6b, PX7b, and PX8b may be mixed to make white. The first color, the second color, and the third color may also be cyan, magenta, and yellow instead of red, green, and blue. Further, the pixel may include a while subpixel.

In each of the pixels PX1, PX2, PX3, PX4, PX5, PX6, PX7, and PX8, the first subpixel PX1r, PX2r, PX3r, PX4r, PX5r, PX6r, PX7r, and PX8r, the second subpixel PX1g, PX2g, PX3g, PX4g, PX5g, PX6g, PX7g, and PX8g, and the third subpixel PX1b, PX2b, PX3b, PX4b, PX5b, PX6b, PX7b, and PX8b are disposed in a first direction. For example, the first direction may be a horizontal direction.

A light blocking member 220 is disposed on the substrate 110. The light blocking member 220 is made of a light blocking material, thereby preventing or reducing light from leaking out. The light blocking member 220 is disposed on the corner of the substrate 110, and some pixels of a plurality of pixels are partially overlapped by the light blocking member 220. For example, the first pixel PX1, the third pixel PX3, the fifth pixel PX5, and the seventh pixel PX7 partially overlap the light blocking member 220. The second pixel PX2 adjacent to the first pixel PX1 in the horizontal direction does not overlap the light blocking member 220. The fourth pixel PX4 adjacent to the third pixel PX3 in the horizontal direction does not overlap the light blocking member 220. The sixth pixel PX6 adjacent to the fifth pixel PX5 in the horizontal direction does not overlap the light blocking member 220. The eighth pixel PX8 adjacent to the seventh pixel PX7 in the horizontal direction does not overlap the light blocking member 220.

In this case, the first pixel PX1, the third pixel PX3, the fifth pixel PX5, and the seventh pixel PX7 overlapping the light blocking member 220 generate a lower luminance, which is relatively lower than normal luminance. The normal luminance means a luminance of each pixel corresponding to a signal input from the outside transmitted to each pixel to generate a predetermined image. In the display device according to the present exemplary embodiment, the compensated signal is transmitted to some of the pixels, for example, to the first pixel PX1, the third pixel PX3, the fifth pixel PX5, and the seventh pixel PX7 to generate a lower luminance than the normal luminance.

In a comparable display device, each pixel is configured to generate the normal luminance to normally display the corresponding image. The comparable display device refers to a screen of a general TV or monitor which has the quadrangle shape. The display device according to the present exemplary embodiment includes the rounded corner and the at least one of subpixels of some pixels of the plurality of pixels overlap the light blocking member 220. Even if the pixel overlapping the light blocking member 220 is applied with the data voltage to generate the normal luminance, the portion of the pixels covered by the light blocking member 220 may not generate the normal luminance. That is, the portion of the overlapping pixels covered by the light blocking member 220 displays black.

In the present exemplary embodiment, at least a part of the first pixel PX1, the third pixel PX3, the fifth pixel PX5, and the seventh pixel PX7 overlap the light blocking member 220, and the parts overlapping the light blocking member 220 display the black. The first subpixel PX1r of the first pixel PX1 and the first subpixel PX3r of the third pixel PX3 completely overlap the light blocking member 220. The second subpixel PX1g and the third subpixel PX1b of the first pixel PX1, the second subpixel PX3g and the third subpixel PX3b of the third pixel PX3, the first subpixel PX5r of the fifth pixel PX5, and the first subpixel PX7r of the seventh pixel PX7 partially overlap the light blocking member 220. Accordingly, the first subpixels PX1r, PX3r, PX5r, and PX7r generating the red mostly overlap the light blocking member 220, and the third subpixels PX1b, PX3b, PX5b, and PX7b generating the blue do not substantially overlap the light blocking member 220. Accordingly, when the first pixel PX1, the third pixel PX3, the fifth pixel PX5, and the seventh pixel PX7 generate the normal luminance, the red hardly appears and the blue mostly appears. This may be recognized as a blue band at the corner of the substrate 110. In the present exemplary embodiment, the first pixel PX1, the third pixel PX3, the fifth pixel PX5, and the seventh pixel PX7 overlapping the light blocking member 220 are controlled to generate the lower luminance than the normal luminance, thereby preventing a certain color from displaying relatively brighter at the corner of the substrate 110.

Next, a method of controlling the luminance of the first pixel PX1, the third pixel PX3, the fifth pixel PX5, and the seventh pixel PX7 overlapping the light blocking member 220, and the second pixel PX2, the fourth pixel PX4, the sixth pixel PX6, and the eighth pixel PX8 adjacent thereto will be described with reference to FIGS. 3, 4, 5, and 6. The first pixel PX1, the third pixel PX3, the fifth pixel PX5, and the seventh pixel PX7 are the pixels disposed at the rounded corner, and the second pixel PX2, the fourth pixel PX4, the sixth pixel PX6, and the eighth pixel PX8 are the pixels adjacent to the pixels disposed at the rounded corner.

Figure 3:
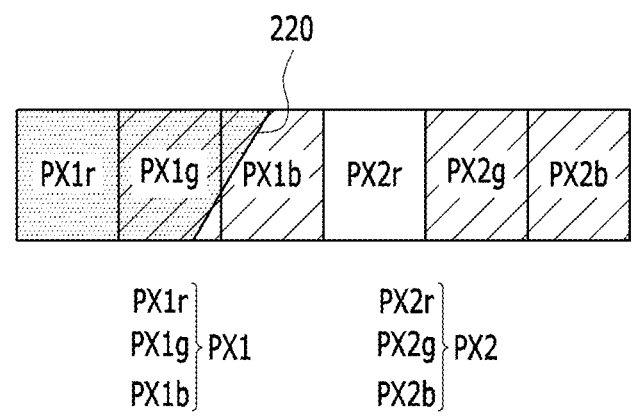
FIG. 3 is a top plan view showing a first pixel and a second pixel of a display device according to an exemplary embodiment.
Figure 4:
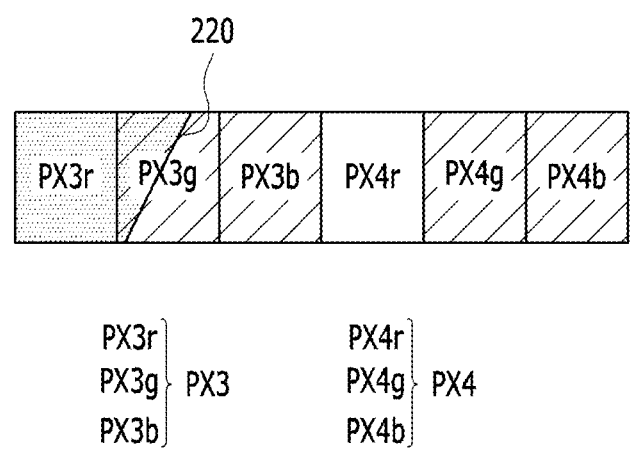
FIG. 4 is a top plan view showing a third pixel and a fourth pixel of a display device according to an exemplary embodiment.
Figure 5:
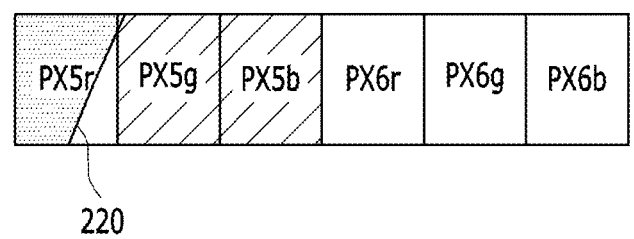
FIG. 5 is a top plan view showing a fifth pixel and a sixth pixel of a display device according to an exemplary embodiment.
Figure 6:
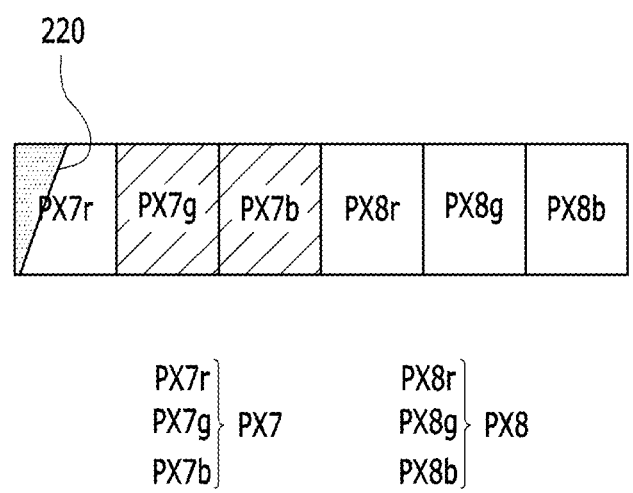
FIG. 6 is a top plan view showing a seventh pixel and an eighth pixel of a display device according to an exemplary embodiment.

FIG. 3 is a top plan view showing a first pixel and a second pixel of a display device according to an exemplary embodiment, and FIG. 4 is a top plan view showing a third pixel and a fourth pixel of a display device according to an exemplary embodiment. FIG. 5 is a top plan view showing a fifth pixel and a sixth pixel of a display device according to an exemplary embodiment, and FIG. 6 is a top plan view showing a seventh pixel and an eighth pixel of a display device according to an exemplary embodiment. Referring to FIGS. 3, 4, 5, and 6, the subpixels generating the different luminance from the normal luminance are illustrated as filled with diagonal lines, and the subpixels generating the normal luminance are not filled.

As shown in FIG. 3, the first subpixel PX1r of the first pixel PX1 completely overlaps the light blocking member 220, the second subpixel PX1g and the third subpixel PX1b of the first pixel PX1 partially overlap the light blocking member 220, and the second pixel PX2 does not overlap the light blocking member 220. The second pixel PX2 is disposed adjacent to the first pixel PX1 away from the round corner of the substrate 110.

The first pixel PX1 partially overlapping the light blocking member 220 generates the lower luminance than the normal luminance. Particularly, the second subpixel PX1g and the third subpixel PX1b of the first pixel PX1 generate the lower luminance than the normal luminance. By compensating data voltage and applying the compensated data voltage to the second subpixel PX1g and the third subpixel PX1b of the first pixel PX1, the luminance may be lowered. In this case, the second subpixel PX2g and the third subpixel PX2b of the second pixel PX2 adjacent to the first pixel PX1 generate the lower luminance than the normal luminance. By compensating data voltage and applying the compensated data voltage to the second subpixel PX2g and the third subpixel PX2 of the second pixel PX2, the luminance may be lowered. The first subpixel PX2r of the second pixel PX2 may generate the normal luminance.

Accordingly, the sum of the gray value generated by the second subpixel PX1g of the first pixel PX1 and the gray value generated by the second subpixel PX1g of the second pixel PX2 may be substantially the same as the gray value of the normal luminance generated by the second subpixel PX1g of the second pixel PX2. That is, the second subpixel PX2g of the second pixel PX2 may be controlled to generate the normal luminance along with the second subpixel PX1g of the first pixel PX1.

Also, the sum of the gray value generated by the third subpixel PX1b of the first pixel PX1 and the gray value generated by the third subpixel PX2b of the second pixel PX2 may be substantially the same as the gray value of the normal luminance generated by the third subpixel PX2b of the second pixel PX2. That is, the third subpixel PX2b of the second pixel PX2 may be controlled to generate the normal luminance along with the third subpixel PX1b of the first pixel PX1.

The first subpixel PX1r of the first pixel PX1 is completely covered by the light blocking member 220 and therefore, generates black.

According to the exemplary embodiment, the first subpixel PX2r, the second subpixel PX2g, and the third subpixel PX2b of the second pixel PX2 may substantially generate one pixel with the second subpixel PX1g and the third subpixel PX1b of the first pixel PX1, respectively. That is, since the first subpixel PX1r of the first pixel PX1 is covered by the light blocking member 220, to prevent the green or the blue from being displayed relatively brighter in the portion adjacent to the light blocking member 220, the luminance of the green and the blue of the first pixel PX1 and the second pixel PX2 adjacent thereto are lowered. That is, the first pixel PX1 and the second pixel PX2 are controlled to substantially function like one pixel through the sum thereof.

In this case, a ratio of the gray value of the second subpixel PX1g of the first pixel PX1 and the gray value of the second subpixel PX2g of the second pixel PX2 may be determined to have different value. The gray value of the second subpixel PX1g of the first pixel PX1 and the gray value of the second subpixel PX2g of the second pixel PX2 may be determined to have the same value. The gray value of the second subpixel PX1g of the first pixel PX1 may be determined to have smaller value than the gray value of the second subpixel PX2g of the second pixel PX2. For example, the ratio of the gray value of the second subpixel PX1g of the first pixel PX1 and the gray value of the second subpixel PX2g of the second pixel PX2 may be determined to be 30:70.

The ratio of the gray value of the third subpixel PX1b of the first pixel PX1 and the gray value of the third subpixel PX2b of the second pixel PX2 may be determined to have different value. The gray value of the third subpixel PX1b of the first pixel PX1 and the gray value of the third subpixel PX2b of the second pixel PX2 may be determined to have the same value. The gray value of the third subpixel PX1b of the first pixel PX1 may be determined to have smaller value than the gray value of the third subpixel PX2b of the second pixel PX2.

As shown in FIG. 4, the first subpixel PX3r of the third pixel PX3 completely overlaps the light blocking member 220, the second subpixel PX3g and the third subpixel PX3b of the third pixel PX3 overlap the part of the light blocking member 220, and the fourth pixel PX4 does not overlap the light blocking member 220. The fourth pixel PX4 is disposed adjacent to the third pixel PX3 away from the round corner of the substrate 110.

The second subpixel PX3g and the third subpixel PX3b of the third pixel PX3 overlapping the part of the light blocking member 220 generate the lower luminance than the normal luminance. The luminance may be lowered by compensating data voltage and applying the compensated data voltage to the second subpixel PX3g and the third subpixel PX3b of the third pixel PX3. In this case, the second subpixel PX4g and the third subpixel PX4b of the fourth pixel PX4 adjacent to the third pixel PX3 generate the lower luminance than the normal luminance. The luminance may be lowered by compensating data voltage and applying the compensated data voltage to the second subpixel PX4g and the third subpixel PX4b of the fourth pixel PX4. The first subpixel PX4r of the fourth pixel PX4 generates the normal luminance.

Accordingly, the sum of the gray value generated by the second subpixel PX3g of the third pixel PX3 and the gray value generated by the second subpixel PX4g of the fourth pixel PX4 may be substantially the same as the gray value of the normal luminance generated by the second subpixel PX4g of the fourth pixel PX4. Also, the sum of the gray value of the third subpixel PX3b of the third pixel PX3 and the gray value of the third subpixel PX4b of the fourth pixel PX4 may be substantially the same as the gray value of the normal luminance generated by the third subpixel PX4b of the fourth pixel PX4. That is, the third pixel PX3 and the fourth pixel PX4 are controlled to substantially function like one pixel through the sum thereof.

In this case, the gray value of the second subpixel PX3g of the third pixel PX3 may be equal to or smaller than the gray value of the second subpixel PX4g of the fourth pixel PX4. The gray value of the third subpixel PX3b of the third pixel PX3 may be equal to or smaller than the gray value of the third subpixel PX4b of the fourth pixel PX4.

As shown in FIG. 5, the first subpixel PX5r and the second subpixel PX5g of the fifth pixel PX5 partially overlap the light blocking member 220, and the third subpixel PX5b of the fifth pixel PX5 and the first subpixel PX6r, the second subpixel PX6g, and the third subpixel PX6b of the sixth pixel PX6 do not overlap the light blocking member 220. The sixth pixel PX6 is disposed farther than the fifth pixel PX5 from the corner of the substrate 110.

The fifth pixel PX5 overlapping the part of the light blocking member 220 generates the lower luminance than the normal luminance. The area where the first subpixel PX5r of the fifth pixel PX5 overlaps the light blocking member 220 is larger than the area where the second subpixel PX5g overlaps the light blocking member 220 and the area where the third subpixel PX5b overlaps the light blocking member 220. In this case, the first subpixel PX5r of the fifth pixel PX5 which has the largest area overlapping the light blocking member 220 is configured to generate the normal luminance. The second subpixel PX5g of the fifth pixel PX5 has relatively smaller area overlapping the light blocking member 220 and the third subpixel PX5b of the fifth pixel PX5 that does not overlap the light blocking member 220 are controlled to generate the lower luminance than the normal luminance. The luminance may be lowered by compensating the data voltage and applying the compensated data voltage to the second subpixel PX5g and the third subpixel PX5b of the fifth pixel PX5. The sixth pixel PX6 adjacent to the fifth pixel PX5 is configured to generate the normal luminance.

The luminance of the second subpixel PX5g of the fifth pixel PX5 may be determined by considering the overlapping area of the first subpixel PX5r which overlaps the light blocking member 220 and the overlapping area of the second subpixel PX5g which overlaps the light blocking member 220. For example, the overlapping area of the first subpixel PX5r of the fifth pixel PX5 which overlaps the light blocking member 220 may be about 80% of the area of the first subpixel PX5r, and the overlapping area of the second subpixel PX5g which overlaps the light blocking member 220 may be about 10% of the area of the second subpixel PX5g. In this case, the area where the first subpixel PX5r of the fifth pixel PX5 may generate the luminance is substantially about 20%, and the area where the second subpixel PX5g may generate the luminance is substantially about 90%. By considering this, the luminance of the second subpixel PX5g may be lowered to about ⅖ of the normal luminance.

Accordingly, the luminance of the third subpixel PX5b of the fifth pixel PX5 is determined by considering the overlapping area of the first subpixel PX5r which overlaps the light blocking member 220. For example, the overlapping area of the first subpixel PX5r of the fifth pixel PX5 which overlaps the light blocking member 220 may be about 80% of the area of the first subpixel PX5r, and the overlapping area of the third subpixel PX5b which overlaps the light blocking member 220 may be 0. In this case, the area where the first subpixel PX5r of the fifth pixel PX5 may generate the luminance is substantially about 20%, and the area where the third subpixel PX5b may generate the luminance is substantially about 100%. By considering this, the luminance of the third subpixel PX5b may be lowered to about 2/10 of the normal luminance.

However, the exemplary embodiments are not limited thereto, and each luminance of the subpixels PX5r, PX5g, and PX5b may be appropriately lowered by considering the area where the first subpixel PX5r, the second subpixel PX5g, and the third subpixel PX5b of the fifth pixel PX5 respectively overlap the light blocking member 220.

As shown in FIG. 6, a part of the first subpixel PX7r of the seventh pixel PX7 overlaps the light blocking member 220, and the second subpixel PX7g and the third subpixel PX7b of the seventh pixel PX7 and the first subpixel PX8r, the second subpixel PX8g, and the third subpixel PX8b of the eighth pixel PX8 do not overlap the light blocking member 220. The eighth pixel PX8 is disposed farther from the corner of the substrate 110 than the seventh pixel PX7.

The seventh pixel PX7 overlapping the light blocking member 220 generates the lower luminance than the normal luminance. First, the first subpixel PX7r of the seventh pixel PX7 overlapping the light blocking member 220 is applied with data voltage of the normal luminance. The second subpixel PX7g and the third subpixel PX7b of the seventh pixel PX7 that does not overlap the light blocking member 220 is configured to generate the lower luminance than the normal luminance. The luminance may be lowered by compensating the data voltage and applying the compensated data voltage to the second subpixel PX7g and the third subpixel PX7b of the seventh pixel PX7. The eighth pixel PX8 is configured to generate the normal luminance.

The luminance of the second subpixel PX7g and the third subpixel PX7b of the seventh pixel PX7 is determined by considering the overlapping area of the first subpixel PX7r which overlaps the light blocking member 220. For example, the overlapping area of the first subpixel PX7r of the seventh pixel PX7 which overlaps the light blocking member 220 may be about 40% of the area of the first subpixel PX7r. In this case, the area where the first subpixel PX7r of the seventh pixel PX7 may generate the luminance is substantially about 60%, and the area where the second subpixel PX7g and the third subpixel PX7b may generate the luminance is substantially about 100%. Accordingly, the luminance of the second subpixel PX7g may be lowered to about 6/10, and the luminance of the third subpixel PX7b may be lowered to about 6/10.

However, the exemplary embodiments are not limited thereto, and each luminance of the subpixels PX7r, PX7g, and PX7b may be appropriately lowered by considering the area where the first subpixel PX7r, the second subpixel PX7g, and the third subpixel PX7b of the seventh pixel PX7 respectively overlap the light blocking member 220.

A control method for controlling the luminance of the first to eighth pixels PX1, PX2, PX3, PX4, PX5, PX6, PX7, and PX8 may be summarized as follows.

For the first pixel PX1 and the third pixel PX3, which includes subpixels PX1r and PX3r that completely overlap the light blocking member 220, the luminance of the first pixel PX1 and the third pixel PX3 and the luminance of the adjacent pixels, which are the second pixel PX2 and the fourth pixel PX4 may be lowered. Accordingly, the first pixel PX1 and the second pixel PX2 which is adjacent to the first pixel PX1 may be configured to substantially generate the normal luminance of one pixel, and the third pixel PX3 and the fourth pixel PX4 adjacent to the third pixel PX3 may be configured to substantially generate the normal luminance of one pixel.

For the fifth pixel PX5 and the seventh pixel PX7, which includes no subpixel completely overlapping the light blocking member 220 and only a part of the subpixels PX5r, PX5g, and PX7r overlap the light blocking member 220, the luminance of the fifth pixel PX5 and the seventh pixel PX7 is lowered. By considering the overlapping areas of the portion of subpixels PX5r, PX5g, and PX7r which overlap the light blocking member 220, the luminance of the fifth pixel PX5 and the seventh pixel PX7 may be lowered accordingly. The sixth pixel PX6 adjacent to the fifth pixel PX5 and the eighth pixel PX8 adjacent to the seventh pixel PX7 is configured to generate the normal luminance.

Next, a driving unit configured to drive the display device according to an exemplary embodiment will be described with reference to FIG. 7.

Figure 7:
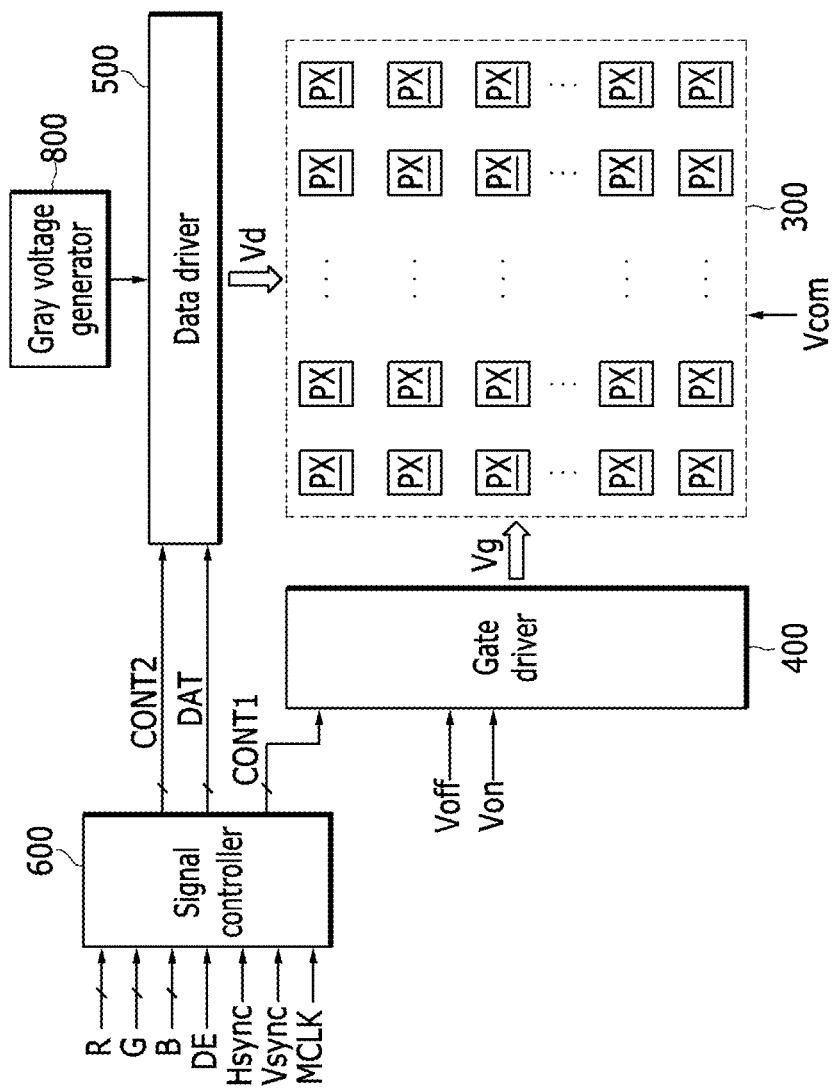
FIG. 7 is a block diagram of a display device according to an exemplary embodiment.

FIG. 7 is a block diagram of a display device according to an exemplary embodiment.

As shown in FIG. 7, the display device according to an exemplary embodiment includes a display panel assembly 300, a gate driver 400 and a data driver 500 connected to the display panel assembly, a gray voltage generator 800 connected to the data driver 500, and a signal controller 600 configured to control the gate driver and the data driver.

The display panel assembly 300 includes a plurality of signal lines and a plurality of pixels PX connected to the signal lines and arranged in an approximate matrix shape. The plurality of signal lines is provided in the lower panel of the display panel assembly 300. The plurality of signal lines includes a plurality of gate lines configured to transmit gate voltage Vg (also referred to as "scanning signals") and a plurality of data lines configured to transmit data voltage Vd. The gate lines extend substantially in a horizontal direction parallel with one another, and the data lines extend substantially in a vertical direction parallel with one another.

The gray voltage generator 800 generates all gray voltages or a predetermined number of the gray voltages (hereinafter referred to as reference gray voltages) related to transmittance of the pixels PX. The reference gray voltages may include one set having a positive value with reference to a common voltage Vcom, and another set having a negative value with reference to the common voltage Vcom.

The gate driver 400 is connected to the gate lines of the display panel assembly 300, and is configure to apply the gate voltages Vg generated by combining a gate-on voltage Von and a gate-off voltage Voff to the gate lines.

The data driver 500 is connected to the data lines of the display panel assembly 300, and is configured to select the gray voltages generated by the gray voltage generator 800 and apply the selected gray voltage to the data lines accordingly to the data signal DAT. However, in the case that the gray voltage generator 800 does not supply all the voltages for all the gray levels but rather supplies a predetermined number of reference gray voltages, the data driver 500 is configured to generate gray voltages for all gray levels by dividing the reference gray voltages, and according to the received data signal DAT.

The signal controller 600 is configured to control the gate driver 400 and the data driver 500.

As described above, the luminance of pixels overlapping the light blocking member 220 may be controlled to be lower than the normal luminance, and there are various methods for accomplishing this.

If the gray value to generate the normal luminance for each pixel is received from the outside, the data driver 500 is configured to apply the gray voltage corresponding to the gray value to the corresponding data line. In this case, the gray values of the portion of pixels to be lowered are compensated, and the gray voltages corresponding to the corresponding gray values are selected and applied to the data lines as the data voltage, thereby controlling the corresponding pixels to have lower than normal luminance.

As another method, a gamma value determining a correlation between the gray value and the luminance of the image may be compensated. By increasing the gamma values of the portion of pixels, the corresponding pixels may be controlled to have lower luminance than normal luminance.

The display device according to an exemplary embodiment may further include a data correction unit configured to compensate the gray values of the portion of pixels and compensate the gamma values. The data correction unit may be disposed in the data driver 500, may be disposed in the signal controller 600, or may be disposed at other location.

Next, the display device according to an exemplary embodiment will be described with reference to FIG. 8.

Figure 8:
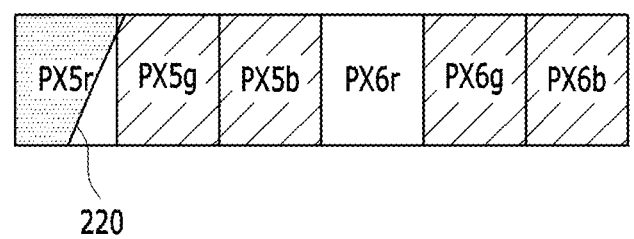
FIG. 8 is a top plan view showing a fifth pixel and a sixth pixel of a display device according to an exemplary embodiment.

The display device according to the exemplary embodiment shown in FIG. 8 is similar to the display device according to the exemplary embodiment shown in FIG. 1 to FIG. 6, and therefore, the same description is omitted. In the present exemplary embodiment, when the overlapping areas of subpixels of one pixel, which overlap the light blocking member 220, are greater than 50% of the total area of the corresponding subpixels, the one pixel is generated substantially differently from the previous exemplary embodiment, and this is described in detail.

FIG. 8 is a top plan view generating a fifth pixel and a sixth pixel of a display device according to an exemplary embodiment. In FIG. 8, the subpixels generating the lower luminance than the normal luminance are illustrated as filled with diagonal lines and the subpixels generating the normal luminance are not filled.

As shown in FIG. 8, a part of the first subpixel PX5r and a part of the second subpixel PX5g of the fifth pixel PX5 overlap the light blocking member 220, and the third subpixel PX5b of the fifth pixel PX5, and the first subpixel PX6r, the second subpixel PX6g, and the third subpixel PX6b of the sixth pixel PX6 do not overlap the light blocking member 220.

The overlapping area of the first subpixel PX5r of the fifth pixel PX5 which overlaps the light blocking member 220 is 50% or more of the area of the first subpixel PX5r. In this case, it the first subpixel PX5r of the fifth pixel PX5 may be considered completely overlapping the light blocking member 220. Accordingly, the luminance of the fifth pixel PX5 and the sixth pixel PX6 adjacent to the fifth pixel PX5 may be jointly lowered. The second subpixel PX5g and the third subpixel PX5b of the fifth pixel PX5 generate the lower luminance than the normal luminance, and the second subpixel PX6g and the third subpixel PX6b of the sixth pixel PX6 generate the lower luminance than the normal luminance. The data voltage is compensated and the compensated data voltage is applied to the second subpixel PX5g and the third subpixel PX5b of the fifth pixel PX5, and the second subpixel PX6g and the third subpixel PX6b of the sixth pixel PX6, thereby lowering the luminance. The first subpixel PX5r of the fifth pixel PX5 and the first subpixel PX6r of the sixth pixel PX6 are configured to generate the normal luminance.

The sum of the gray value generated by the second subpixel PX5g of the fifth pixel PX5 and the gray value generated by the second subpixel PX6g of the sixth pixel PX6 may be substantially the same as the gray value of the normal luminance generated by the second subpixel PX6g of the sixth pixel PX6. The sum of the gray value generated by the third subpixel PX5b of the fifth pixel PX5 and the gray value of the third subpixel PX6b of the sixth pixel PX6 may be substantially the same as the gray value of the normal luminance generated by the third subpixel PX6b of the sixth pixel PX6. That is, it is controlled that the sum of the fifth pixel PX5 and the sixth pixel PX6 may substantially generate one pixel.

According to the present exemplary embodiment, the first subpixel PX5r of the fifth pixel PX5 does not completely overlap the light blocking member 220. Therefore, the sum of the gray value of the second subpixel PX5g of the fifth pixel PX5 and the gray value of the second subpixel PX6g of the sixth pixel PX6 may be determined to be greater than the gray value of the normal luminance generated by the second subpixel PX6g of the sixth pixel PX6. Also, the sum of the gray value of the third subpixel PX5b of the fifth pixel PX5 and the gray value of the third subpixel PX6b of the sixth pixel PX6 may be determined to be greater than the gray value of the normal luminance generated by the third subpixel PX6b of the sixth pixel PX6.

The gray value of the second subpixel PX5g of the fifth pixel PX5 may be the same as or smaller than the gray value of the second subpixel PX6g of the sixth pixel PX6. The gray value of the third subpixel PX5b of the fifth pixel PX5 may be the same as or smaller than the gray value of the third subpixel PX6b of the sixth pixel PX6.

Figure 9:
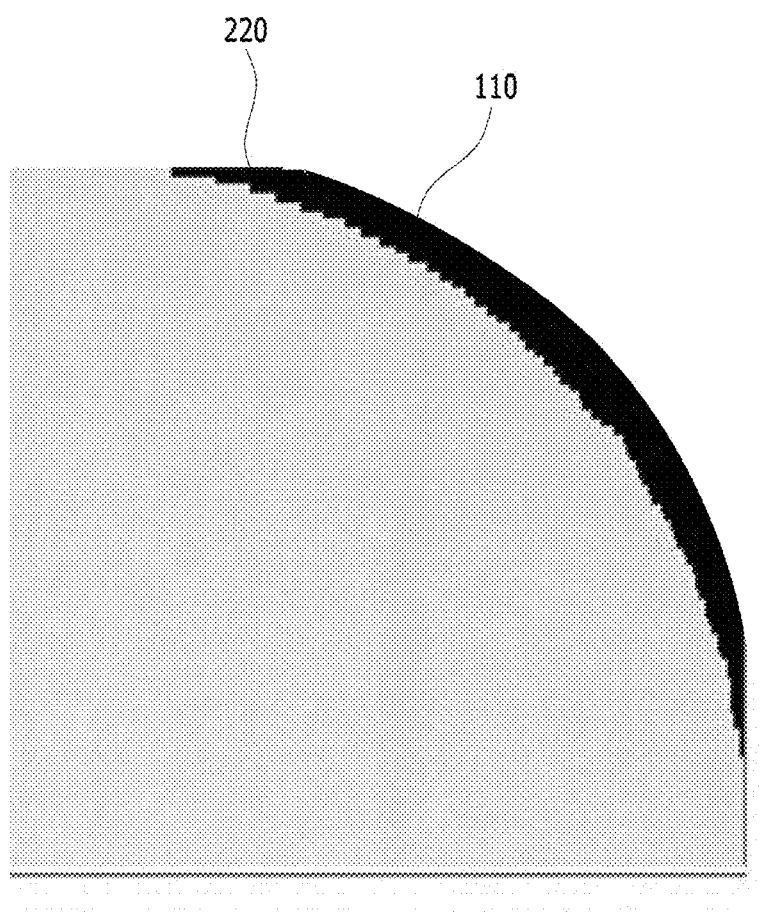
FIG. 9 is a view showing a display screen having a rounded corner of a display device according to a comparative example.
Figure 10:
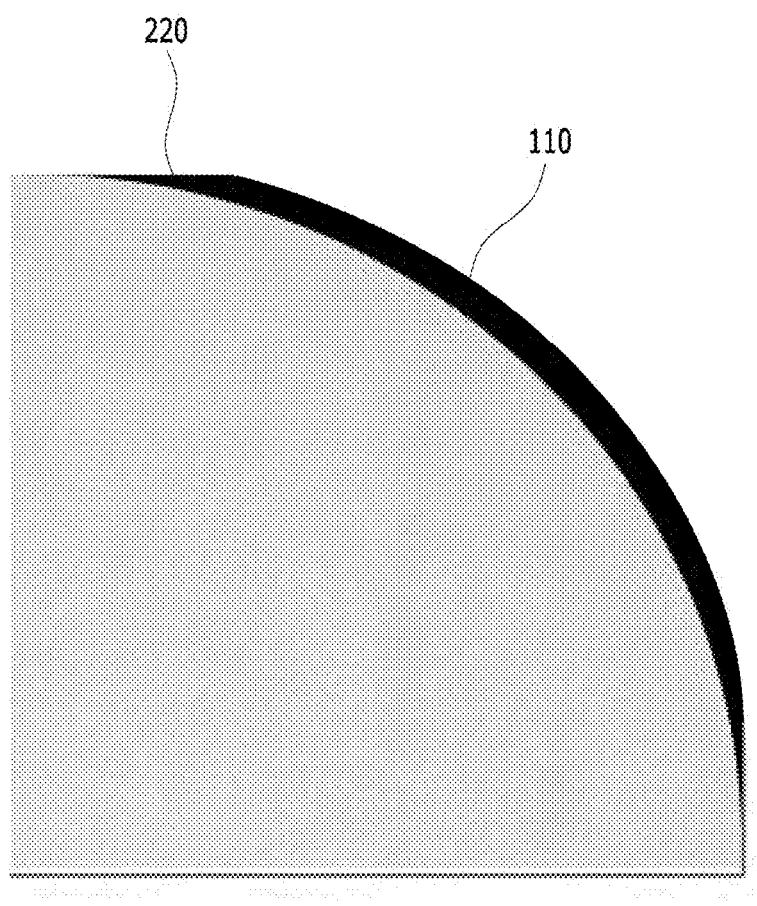
FIG. 10 is a view showing a display screen having a rounded corner of a display device according to an exemplary embodiment.

Next, the display screen with the rounded corner of the display device according to an exemplary embodiment will be described with reference to FIG. 10, compared with the display device according to a comparable example of FIG. 9.

FIG. 9 is a view showing a display screen of a rounded corner of a display device according to a comparable example, and FIG. 10 is a view showing a display screen of a rounded corner of a display device according to an exemplary embodiment.

In the display device according to the comparable example, the pixel disposed in the rounded corner is not driven. That is, the pixels overlapping the light blocking member 220 on substrate 110 are all turned off. The plurality of pixels is disposed in the matrix shape along the horizontal direction and the vertical direction, and each pixel has the rectangular shape. Accordingly, as shown in FIG. 9, the pixels disposed in the adjacent to the rounded corner of the substrate 110 may display a stepped shape.

In the display device according to an exemplary embodiment, the pixels disposed in the rounded corner are driven. That is, the pixels overlapping the light blocking member 220 of substrate 110 are all turned on. Accordingly, as shown in FIG. 10, the rounded corner appearing to have a stepped shape may be prevented. Furthermore, a stripe of the partial color appearing in the rounded corner may be prevented.

Next, the display device according to an exemplary embodiment will be described with reference to FIG. 11 and FIG. 12.

Figure 11:
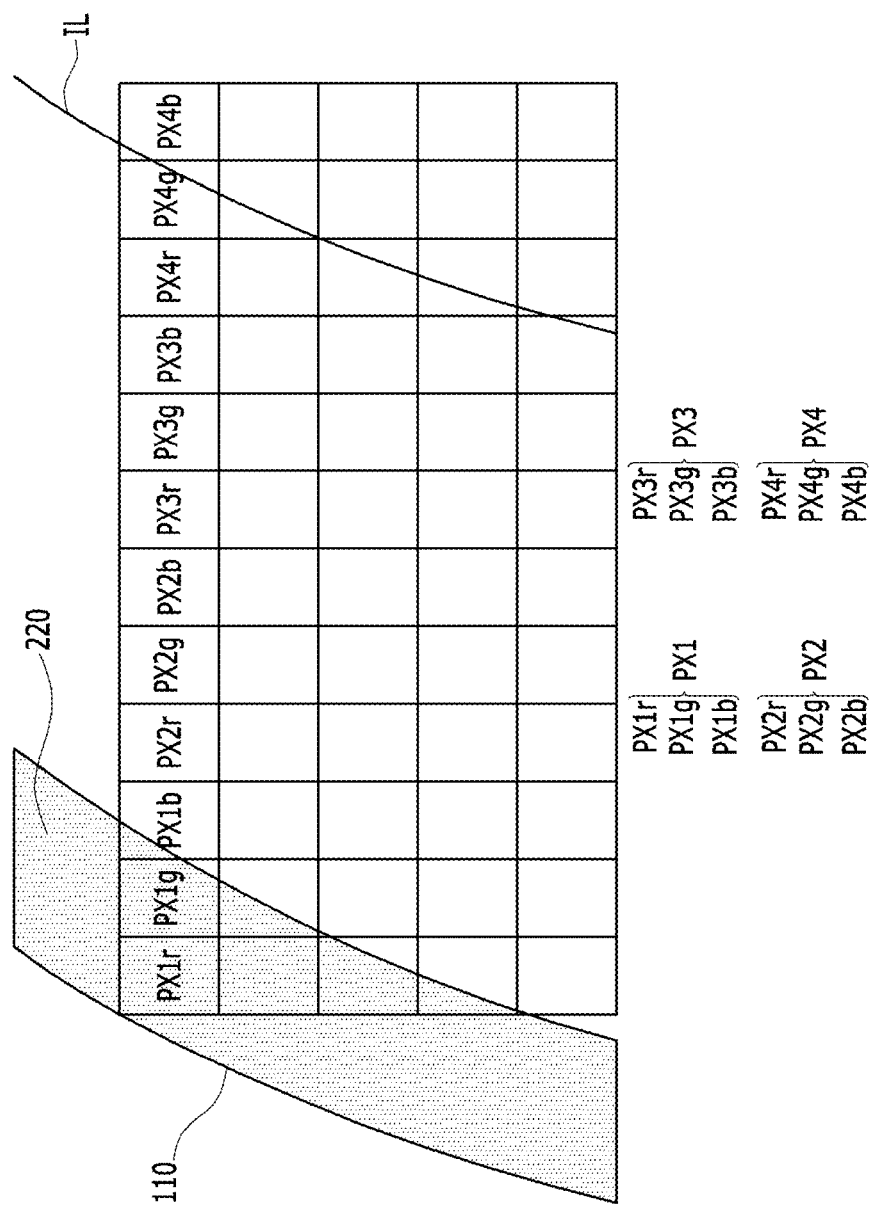
FIG. 11 is a top plan view showing pixels of a portion of a display device according to an exemplary embodiment.
Figure 12:
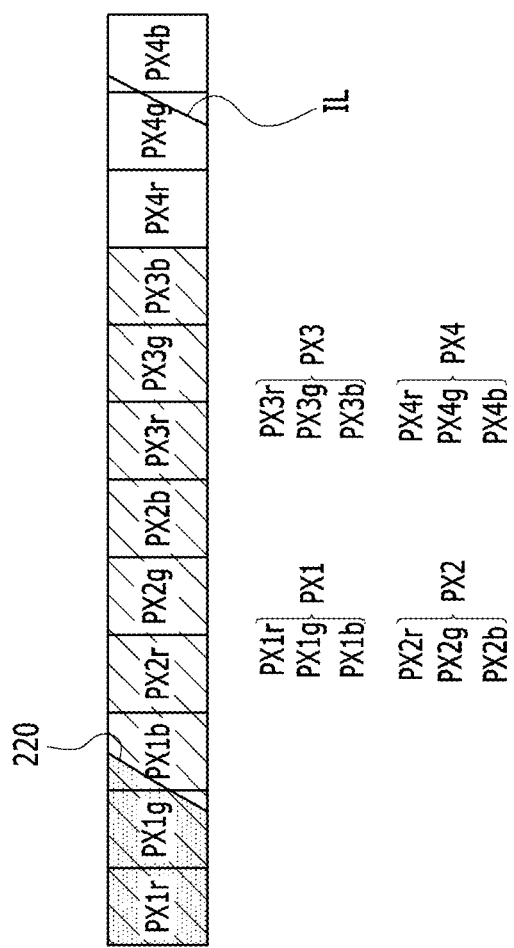
FIG. 12 is a top plan view showing a first pixel to a fourth pixel of a display device according to an exemplary embodiment.

The display device according to an exemplary embodiment shown in FIG. 11 and FIG. 12 is similar to the display device according to an exemplary embodiment shown in FIG. 1 to FIG. 6, and therefore, the same description is omitted. In the present exemplary embodiment, the pixels overlapping the light blocking member 220 are turned off compared to the previous exemplary embodiment, which will be described in detail below.

FIG. 11 is a top plan view showing a portion of pixels of a display device according to an exemplary embodiment. FIG. 11 shows the pixels disposed at the rounded corner and the pixels adjacent thereto. FIG. 12 is a top plan view showing a first pixel PX1 to a fourth pixel PX4 of a display device according to an exemplary embodiment. In FIG. 12, the subpixels generating the different luminance from the normal luminance are illustrated as filled with diagonal lines and the subpixels generating the normal luminance are not filled.

As shown in FIG. 11, the display device according to an exemplary embodiment includes the substrate 110 and the substrate 110 has the rounded corner. A plurality of pixels including a first pixel PX1, a second pixel PX2, a third pixel PX3, and a fourth pixel PX4 are disposed on the substrate 110. The first pixel PX1, the second pixel PX2, the third pixel PX3, and the fourth pixel PX4 are sequentially disposed along the horizontal direction. The first pixel PX1 is disposed on the corner of the substrate 110, and the second pixel PX2 is disposed adjacent to the first pixel PX1 farther from the corner of the substrate 110 than the first pixel PX1. The third pixel PX3 is disposed adjacent to the second pixel PX2 farther from the corner of the substrate 110 than the second pixel PX2. The fourth pixel PX4 is disposed adjacent to the third pixel PX3 farther from the corner of the substrate 110 than the third pixel PX3.

The first to fourth pixels PX1, PX2, PX3, and PX4 may respectively include the first subpixels PX1r, PX2r, PX3r, and PX4r, the second subpixels PX1g, PX2g, PX3g, and PX4g, and the third subpixels PX1b, PX2b, PX3b, and PX4b.

The light blocking member 220 is disposed on the corner of the substrate 110. The first pixel PX1 overlaps the light blocking member 220, and the second pixel PX2, the third pixel PX3, and the fourth pixel PX4 do not overlap the light blocking member 220.

An imaginary line IL having a predetermined interval from the corner of the substrate 110 may be disposed on the substrate 110. The fourth pixel PX4 separated from the first pixel PX1 along the first direction may overlap the imaginary line IL. In this case, the first direction may be the horizontal direction.

The first pixel PX1 overlapping the light blocking member 220 is not driven. That is, the first pixel PX1 is turned off, and the first pixel PX1 generates a black gray level. The first pixel PX1 generates the lowest luminance.

The second pixel PX2 adjacent to the first pixel PX1 in the horizontal direction generates a higher luminance than the first pixel. The third pixel PX3 adjacent to the second pixel PX2 in the horizontal direction generates a higher luminance than the second pixel. The fourth pixel PX4 adjacent to the third pixel PX3 in the horizontal direction generates a higher luminance than the third pixel.

The fourth pixel PX4 overlapping the imaginary line IL generates the normal luminance. The second pixel PX2 and the third pixel PX3 disposed between the first pixel PX1 and the fourth pixel PX4 generate the luminance between the lowest luminance and the normal luminance generated by the fourth pixel PX4. The luminance is gradually increased from the first pixel PX1 toward the fourth pixel PX4.

The distance between the corner of the substrate 110 and the imaginary line IL may be variously changed. In FIG. 11 and FIG. 12, in the corner of the substrate 110, two pixels are disposed between the first pixel PX1 overlapping the light blocking member 220 and the fourth pixel PX4 overlapping the imaginary line IL. However, the exemplary embodiments are not limited thereto, and the distance between the corner of the substrate 110 and the imaginary line IL may be shorter or longer. For example, five pixels may be disposed between the pixel overlapping the light blocking member 220 and the pixel overlapping the imaginary line.

Also, the luminance of the pixels disposed between the corner of the substrate 110 and the imaginary line IL may be variously changed. The luminance may be gradually increased from the first pixel PX1 toward the fourth pixel PX4 by using a linear function, and various functions may be used instead of the linear function.

The distance between the corner of the substrate 110 and the imaginary line IL and the luminance of the pixels disposed between the corner of the substrate 110 and the imaginary line IL may be set in the driver of the display device. Also, the distance and the luminance may be variously changed by a user of the display device using firmware.

Next, the display screen with the rounded corner of the display device according to an exemplary embodiment will be described with reference to FIG. 13.

Figure 13:
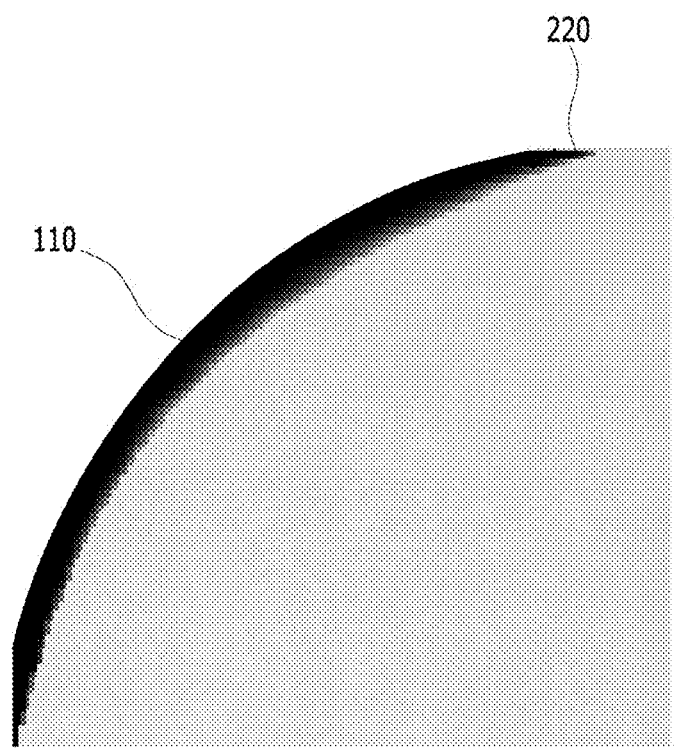
FIG. 13 is a view showing a display screen having a rounded corner of a display device according to an exemplary embodiment.

FIG. 13 is a view showing a display screen with a rounded corner of a display device according to an exemplary embodiment.

In the display device according to an exemplary embodiment, the pixel disposed in the rounded corner is not driven. That is, the pixels overlapping the light blocking member 220 on substrate 110 are all turned off. By gradually increasing the luminance of the pixel overlapping the light blocking member 220 and the pixels adjacent thereto, the rounded corner appearing to have a stepped shape may be prevented or reduced. Furthermore, as the pixel overlapping the light blocking member 220 generates the black gray value, the appearance of a stripe of the partial color in the rounded corner may be prevented.

Next, a method of changing a curvature of the display device according to an exemplary embodiment will be described with reference to FIG. 14.

Figure 14:
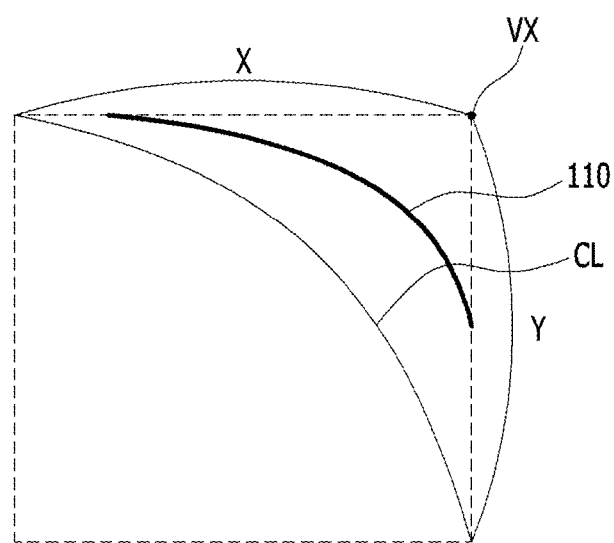
FIG. 14 is a top plan view showing a portion of a display device according to an exemplary embodiment.

FIG. 14 is a top plan view showing a portion a display device according to an exemplary embodiment.

In the present exemplary embodiment, the curvature of the rounded corner of the display device may be changed. As shown in FIG. 14, the curvature of the display device is determined by the curvature of the rounded corner of the substrate 110. However, the curvature of the region where the screen is displayed may be different from the curvature of the rounded corner of the substrate 110. A curvature changing line CL may be the corner of the region where the screen is displayed. In this case, the pixels disposed between the curvature changing line CL and the rounded corner of the substrate 110 may generate a black gray. By turning off the pixels disposed between the curvature changing line CL and the rounded corner of the substrate 110, the lowest luminance may be generated.

The curvature changing line CL shown in FIG. 14 is only exemplary, and the curvature changing line CL may be various. When it is assumed that the substrate 110 is formed as the quadrangle, various curvature changing lines CL may be formed along a pixel number X of the horizontal direction and a pixel number Y of the vertical direction from a position where the corner of the substrate 110 and the curvature changing line CL meet a vertex VX. The user may select one among the various curvature changing lines CL.

Also, the luminance of the pixel overlapping the curvature changing line CL and the pixel adjacent thereto may be controlled to be gradually increased. Accordingly, the curvature changing line CL may be prevented from appearing to have a stepped shape.

According to the exemplary embodiments, the rounded corner of the display device may be prevented or reduced from being generated as a step shape.

Also, the pixel disposed at the rounded corner may generate the white gray value to avoid the appearance of a colored stripe.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device comprising:
   a substrate having a rounded corner;
   a plurality of pixels disposed on the substrate; and
   a light blocking member disposed on a corner of the substrate and overlapping at least part of a first pixel of the plurality of pixels, the first pixel disposed at the rounded corner,
   wherein the first pixel is configured to generate a lower luminance, the lower luminance referring to a luminance lower than a normal luminance, and
   wherein the first pixel is configured to generate the lower luminance by compensating data voltage applied to the first pixel based at least on an area of the first pixel overlapping the light blocking member.

2. The display device of claim 1, wherein:
   each of the plurality of pixels respectively comprises
   a first subpixel configured to generate a first color,
   a second subpixel configured to generate a second color, and
   a third subpixel configured to generate a third color;
   a sum of the first color, the second color, and the third color generates a white color; and
   the first subpixel, the second subpixel, and the third subpixel are arranged along a first direction.

3. The display device of claim 2, further comprising a second pixel of the plurality of pixels disposed adjacent to the first pixel in the first direction, farther from the rounded corner of the substrate than the first pixel,
   wherein at least one of the first subpixel, the second subpixel, and the third subpixel of the first pixel completely overlap the light blocking member, and
   wherein the second pixel is configured to generate the lower luminance.

4. The display device of claim 3, wherein
   the first subpixel of the first pixel completely overlaps the light blocking member, and
   a sum of a gray value generated by the second subpixel of the first pixel and a gray value generated by the second subpixel of the second pixel is the same as a gray value of the normal luminance generated the second subpixel of the second pixel.

5. The display device of claim 4, wherein
   the gray value generated by the second subpixel of the first pixel is equal to or smaller than the gray value generated by the second subpixel of the second pixel.

6. The display device of claim 4, wherein
   a sum of a gray value generated by a third subpixel of the first pixel and a gray value generated by a third subpixel of the second pixel is the same as the gray value of the normal luminance generated by the third subpixel of the second pixel.

7. The display device of claim 6, wherein
   the gray value generated by the third subpixel of the first pixel is equal to or smaller than the gray value generated by the third subpixel of the second pixel.

8. The display device of claim 2, further comprising a second pixel of the plurality of pixels disposed adjacent to the first pixel in the first direction, farther from the rounded corner of the substrate than the first pixel,
   wherein each of the first subpixel, the second subpixel, and the third subpixel of the first pixel do not completely overlap the light blocking member, and
   wherein the second pixel is configured to generate the normal luminance.

9. The display device of claim 8, wherein
   an area that the first subpixel of the first pixel overlapping the light blocking member is larger than an area that the second subpixel of the first pixel overlapping the light blocking member
   an area that the first subpixel of the first pixel overlapping the light blocking member is larger than an area that the third subpixel of the first pixel overlapping the light blocking member, and
   the first subpixel of the first pixel is configured to generate the normal luminance, and the second subpixel of the first pixel and the third subpixel of the first pixel are configured to generate the lower luminance.

10. The display device of claim 2, further comprising a second pixel of the plurality of pixels disposed adjacent to the first pixel in the first direction, farther from the rounded corner of the substrate than the first pixel,
    wherein an area of at least one of the first subpixel, the second subpixel, and the third subpixel of the first pixel overlapping the light blocking member is 50% or more of a total area of the at least one of the first subpixel, the second subpixel, and the third subpixel of the first pixel, and
    wherein the second pixel is configured to generate the lower luminance.

11. The display device of claim 10, wherein
    the area of the first subpixel of the first pixel overlapping the light blocking member is 50% or more of the total area of the first subpixel of the first pixel,
    a sum of a gray value generated by the second subpixel of the first pixel and a gray value generated by the second subpixel of the second pixel is the same as a gray value of the normal luminance generated by the second subpixel of the second pixel.

12. The display device of claim 11, wherein
the gray value generated by the second subpixel of the first pixel is equal to or smaller than the gray value generated by the second subpixel of the second pixel.

13. The display device of claim 11, wherein
a sum of a gray value generated by the third subpixel of the first pixel and a gray value generated by the third subpixel of the second pixel is the same as a gray value of the normal luminance generated by the third subpixel of the second pixel.

14. The display device of claim 13, wherein
the gray value generated by the third subpixel of the first pixel is equal to or smaller than the gray value generated by the third subpixel of the second pixel.

15. The display device of claim 2, further comprising a second pixel of the plurality of pixels disposed adjacent to the first pixel in the first direction, farther from the rounded corner of the substrate than the first pixel,
wherein areas of each of the first subpixel, the second subpixel, and the third subpixel of the first pixel overlapping the light blocking member is less than 50% of a total area of the each of the first subpixel, the second subpixel, and the third subpixel of the first pixel, and
wherein the second pixel is configured to generate the normal luminance.

16. The display device of claim 15, wherein:
the area that the first subpixel of the first pixel overlapping the light blocking member is larger than the area that the second subpixel of the first pixel overlapping the light blocking member,
the area that the first subpixel of the first pixel overlapping the light blocking member is larger than the area that the third subpixel of the first pixel overlapping the light blocking member, and
the first subpixel of the first pixel is configured to generate the normal luminance, and the second subpixel of the first pixel and the third subpixel of the first pixel are configured to generate the lower luminance.

17. The display device of claim 2, further comprising a second pixel of the plurality of pixels disposed adjacent to the first pixel in the first direction, farther from the rounded corner of the substrate than the first pixel,
wherein the second pixel is configured to generate a luminance higher than the first pixel.

18. The display device of claim 17, further comprising a third pixel to an n-th pixel of the plurality of pixels sequentially disposed in the first direction adjacent from the first pixel away from the rounded corner,
wherein the first pixel to the n-th pixel are configured to generate luminance gradually increasing in the first direction, and
wherein n is a natural number equal to or greater than 3.

19. The display device of claim 18, wherein
the first pixel is configured to generate a black gray value.

20. The display device of claim 2, further comprising a second pixel to an n-th pixel of the plurality of pixels sequentially disposed in the first direction adjacent from the first pixel away from the rounded corner,
wherein the first pixel to the n-th pixel are configured to generate luminance gradually increasing in the first direction, and
wherein n is a natural number equal to or greater than 2.

* * * * *